(12) United States Patent
Seliga et al.

(10) Patent No.: US 6,192,991 B1
(45) Date of Patent: Feb. 27, 2001

(54) CORE PROCESSOR

(76) Inventors: James Seliga, 6543 N. Twp. Road 81, Bellevue, OH (US) 44811; Gordon Seliga, 8207 Station Rd., Northeast, PA (US) 16428

(*) Notice: Subject to any disclaimer, the term of this patent is extended or adjusted under 35 U.S.C. 154(b) by 0 days.

(21) Appl. No.: 09/461,451

(22) Filed: Dec. 14, 1999

(51) Int. Cl.[7] .................................................. A01B 45/02
(52) U.S. Cl. ..................................... 172/22; 241/101.763
(58) Field of Search .................................. 172/21, 22, 33, 172/32; 56/16.4 R, 16.5, 16.6, 228; 241/101.763, 186.4; 198/312, 311, 317, 520, 510.1; 414/501, 486, 487

(56) References Cited

U.S. PATENT DOCUMENTS

| | | | |
|---|---|---|---|
| 3,868,063 | * | 2/1975 | Slaker ............................ 241/101.7 |
| 4,632,189 | * | 12/1986 | Rizzo ................................... 172/22 |
| 4,905,460 | * | 3/1990 | Toman ................................ 56/12.7 |
| 5,816,336 | * | 10/1998 | Underhill ............................. 172/22 |

* cited by examiner

Primary Examiner—Robert E. Pezzuto
(74) Attorney, Agent, or Firm—Jerry Semer

(57) ABSTRACT

The invention is designed to fit in the rear of a utility vehicle. An Aerifier takes aerification cores out of the turf and leaves them on the ground. A core harvester and this invention is attached to a utility vehicle. The core harvester harvests the aeration cores from turf and discharges them into the invention. The invention then takes these aerification cores and grinds them into top dressing and finely chopped thatch for the turf. The cores are dumped by the core harvester down a chute in the invention, the core processor. The cores fall from the chute on to a set of rotation blades that chops the cores into top dressing and finely chopped thatch. The top dressing and finely chopped thatch then fall upon a rotating conveyor belt which takes the top dressing and finely chopped thatch to the discharge area of the invention. The top dressing and finely chopped thatch is discharged to the soil below by a rotating cylindrical brush which brushes the top dressing and finely chopped thatch from the conveyor belt onto the turf.

8 Claims, 3 Drawing Sheets

CORE PROCESSOR

This invention relates to a machine that shreds soil aeration cores into top dressing and finely chopped thatch and returns the shredded soil aeration cores back to the turf and more particularly to a machine that attaches to a utility vehicle and takes the cores from the core harvester and grinds them into top dressing and finely chopped thatch and returns them to the turf.

BACKGROUND OF THE INVENTION

One of the ways to enhance the growth and beauty of a grassy area or lawn is to aerate the turf. To aerate the turf, one usually takes small cores out of the turf which are basically round pieces of soil and root. This process has been used for years in the aeration of large grassy areas and golf courses. There have been a great number of special devices designed to take the cores out of the turf. These devices have been called Aerifers. Aerifers basically take small pieces of grass, soil and root from the turf and create small openings within the turf. These small pieces of turf are called cores. These cores are then harvested by a machine called a core harvester. The present core harvesters on the market basically pick up the cores from the turf and then discharge them into a bed of a utility vehicle. Once the capacity of the utility vehicle has been reached the cores are carried away and disposed of. This invention fits in the rear of the utility vehicle and instead of the cores being discharged into a utility vehicle, the core harvester discharges the cores into this invention and this invention grinds the cores into top dressing and finely chopped thatch and returns them to the turf.

Thus, the objective of this invention is to take the cores created by the aerification process and picked up by the core harvester, and grind them into top dressing and finely chopped thatch that can be used by the soil. This invention has many advantages. First, for the individuals who are doing the aeration of the turf, this invention eliminates the need to carry away and dispose of the cores. In aerification of a golf course the utility vehicle would have to be emptied many times. Thus the invention saves a large amount of time and labor and ultimately money. Secondly, this invention has a great value to the turf and the soil. By returning the cores back to the turf and soil one is able to enrich the soil. In the prior art there are two methods of disposing of the cores by returning them to the soil. The first is to drag a chain link fence over the cores and gradually destroy the cores. This method is not used often since it does significant damage to the turf and is very labor intensive. The second method is to use a mower to grind up the cores. This method does not grind the cores well and is even more labor intensive than the use of the fence. Thus the invention has many advantages to the individuals doing the aerification and it saves them money and time as well as making a better turf. Lastly, this invention benefits society in that it eliminates a waste product that is only dumped into a dump and creates more problems of disposal in the dump and also takes up more area of land. Thus, this invention is of great value to the user, the soil and turf, and society as a whole.

SUMMARY OF THE INVENTION

The invention is designed to fit in the rear of a utility vehicle. An Aerifier takes aerification cores out of the turf and leaves them on the ground. A core harvester and this invention is attached to a utility vehicle. The core harvester harvests the aeration cores from turf and discharges them into the invention. The invention then takes these aerification cores and grinds them into top dressing and finely chopped thatch for the turf. The cores are dumped by the core harvester down a chute in the invention, the core processor. The cores fall from the chute on to a set of rotation blades that chops the cores into top dressing and finely chopped thatch. The top dressing and finely chopped thatch then fall upon a rotating conveyor belt which takes the top dressing and finely chopped thatch to the discharge area of the invention. The top dressing and finely chopped thatch is discharged to the soil below by a rotating cylindrical brush which brushes the top dressing and finely chopped thatch from the conveyor belt onto the turf.

DETAILED DESCRIPTION OF THE PREFERRED EMBODIMENT

Figure 1:
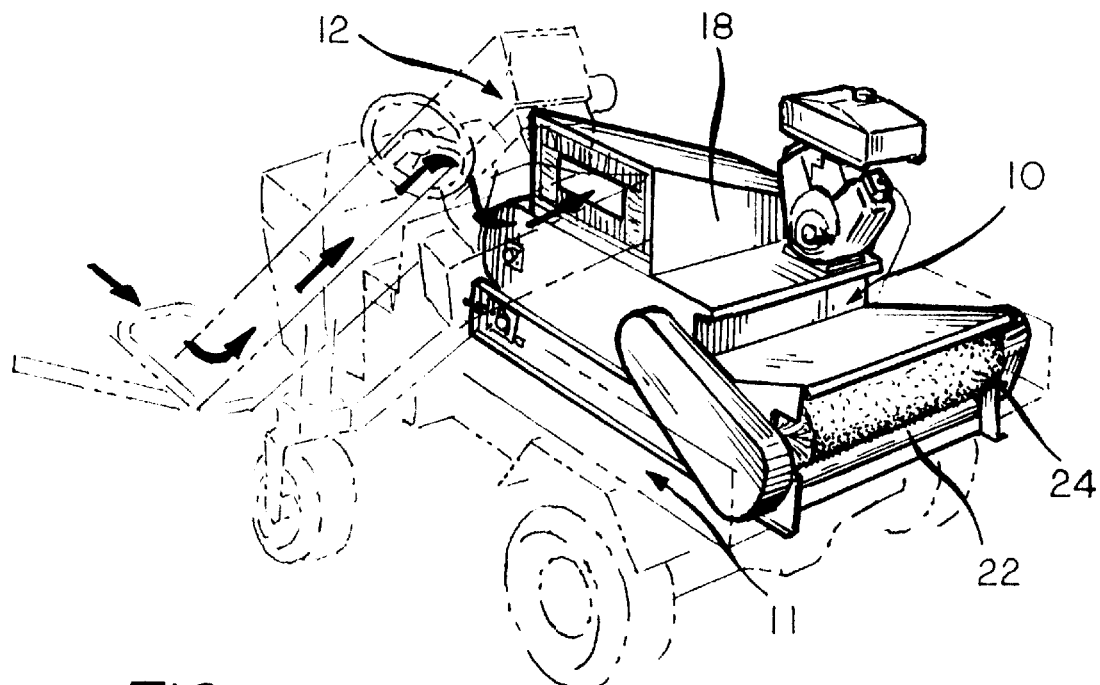
FIG. 1 is a view of the invention on the a utility vehicle with the core processor.

FIG. 1 shows the core processor 10 hooked to the utility vehicle 11 with a core harvester 12. In this drawing the core harvester is Cushman core harvester 12. However, the invention can be hooked to almost any core harvesting device. FIG. 1 shows the core harvester 12 and the core processor 10 on the utility vehicle 11. The core harvester 12 picks up aeration cores from the turf and discharges them into the core processor 10.

FIG. 1 shows the core processor 10 having a housing 16. The core processor 10 is attached to the utility vehicle 11. This allows the core processor 10 to move along with the core harvester 12 which is also attached to the utility vehicle 11. This also allows the core harvester 12 to deposit the cores it has removed from the turf in the chute 18 of the core processor 10.

Figure 2:
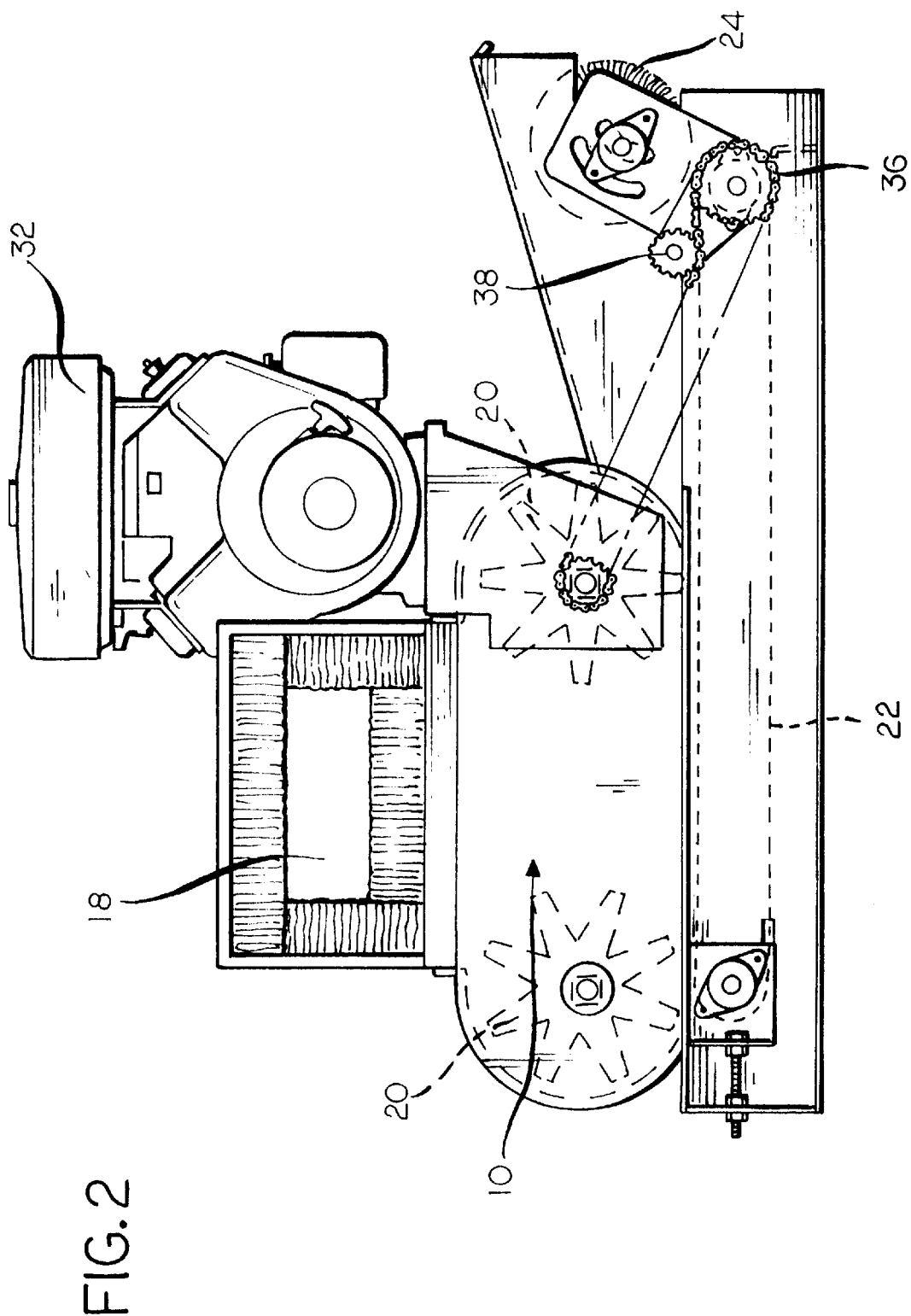
FIG. 2 is a side view of the invention.
Figure 3:
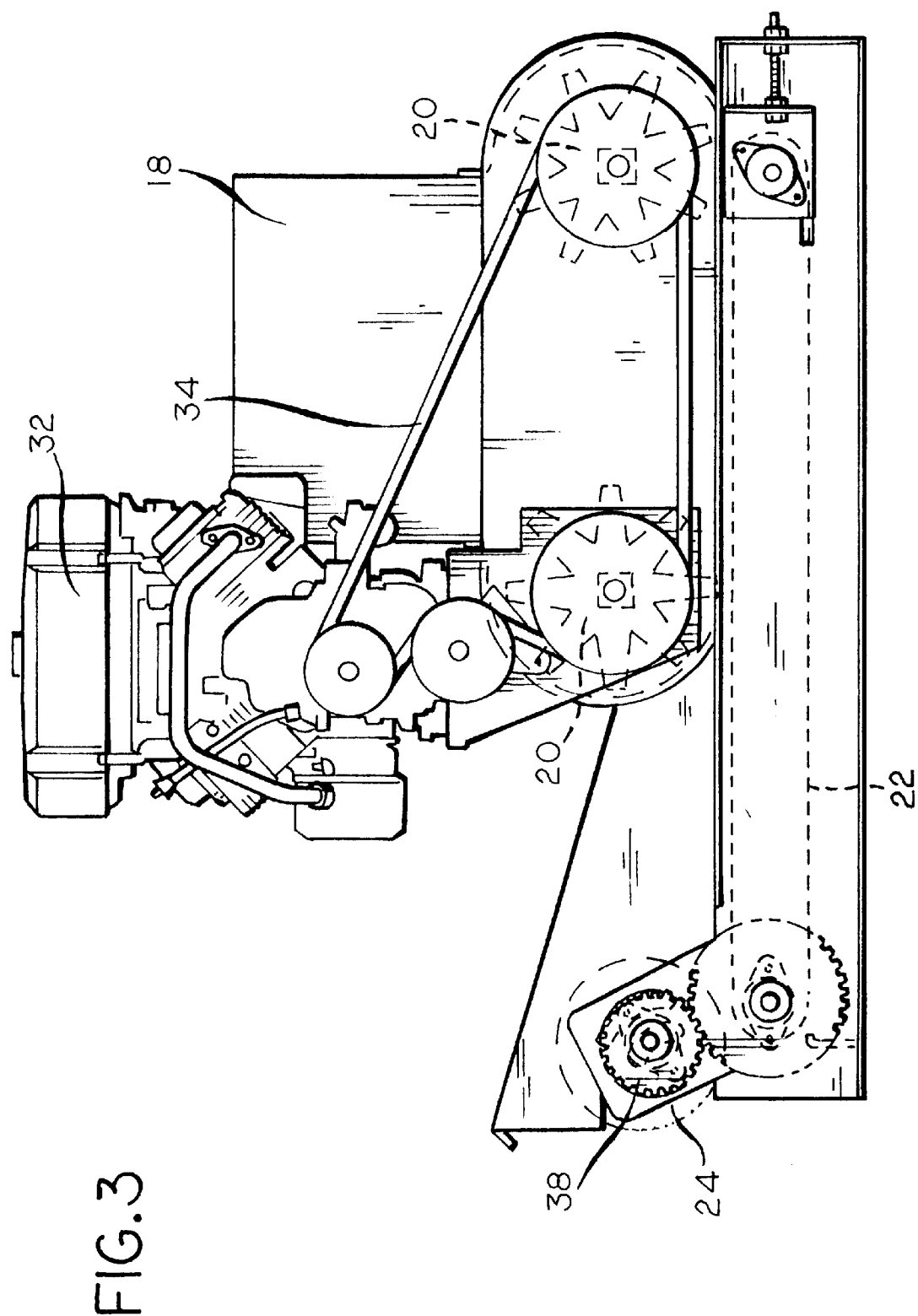
FIG. 3 is a side view of the invention of the other side form FIG. 2.

FIG. 2 is a side view of the core processor 10. FIG. 2 shows a chute 18. This chute 18 receives the cores from the core harvester 12 and directs them towards the rotating blades 20. The cores fall into the rotating blades 20 and are ground into a fine powdery top dressing and finely chopped thatch. FIG. 3 shows the rotary blades 20 are driven by motor 32 by belt drive 34. The belt drive 34 drives both sets of rotary blades 20. The fine powdery top dressing and finely chopped thatch is discharged out of the rotary blades 20 onto a rotary conveyor belt 22. The rotary conveyor belt 22 moves the fine powdery top dressing and finely chopped thatch through the machine and to the discharge area. The conveyor belt 22 is also driven by motor 32. In the preferred embodiment the motor 32 drives the rotary blades 20 which in turn drives the conveyor belt 22 by a chin drive 36. There are many ways known in the art for a motor to drive the conveyor belt and the rotary blades such as gears, belts, direct and/or chains. In the preferred embodiment in the discharge area the processed cores that have been ground up and distributed by the rotating blades 20 on the rotary conveyor belt 22 are then brushed by cylindrical brush 24 off the rotary conveyor belt 22 and onto the turf where they can replenish the soil. There are many way known in the art to remove the processed cores from the conveyor belt and place them on the ground. Instead of a brush one could use a comb or no item to knock the cores off the surface since they would fall when they got to the end of the conveyor belt. In the preferred embodiment the cylindrical brush 24 is driven by the motor 32. In the preferred embodiment the motor 32 drives the rotary blades 20 through a belt drive 34, and the rotary blades 20 drive the conveyor belt 22 through a chain drive 36 and the conveyor belt 22 drives the cylindrical brush 24 through a set of gears 38.

Figure 4A:
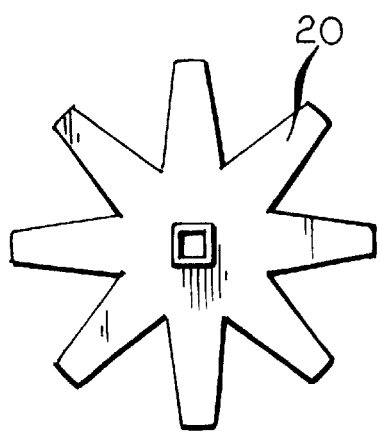
FIG. 4 is a view of the rotary blades.
Figure 4B:
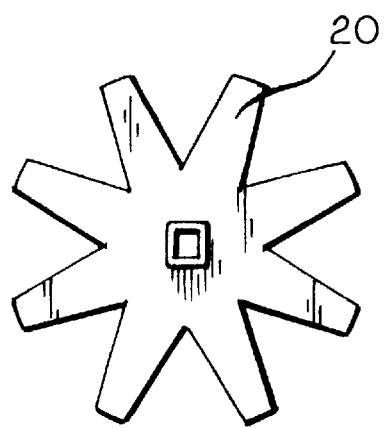

FIG. 4 shows the rotary blades 20. In the preferred embodiment the rotary blades are made out of steel; however they can be made by many substances such as other metals, plastic or rubber.

Changes and modifications in the specifically described embodiments can be carried out without departing from the scope of the invention which is intended to be limited only by the scope of the appending claims.

What is claimed is:

1. A processor that processes soil aeration cores taken from a turf and turns them into top dressing and finely chopped thatch for soil comprising:
   a. a housing; and,
   b. a channel that receives the soil aeration cores and directs the soil aeration cores into the housing; and,
   c. a means for grinding the soil aeration cores into fine top dressing and finely chopped thatch within the housing that is adapted such that when the channel receives the soil aeration cores and directs the soil aeration cores into the housing, the channel inputs the cores into the means for grinding, which grinds the soil aeration cores completely into fine top dressing for turf; and,
   d. a discharge area; and,
   e. a means for transporting the fine top dressing and finely chopped thatch from the means for grinding the soil aeration cores into fine top dressing and finely chopped thatch to the discharge area adapted such that it receives the fine top dressing and finely chopped thatch from means for grinding the soil aeration cores into fine top dressing and finely chopped thatch and transports the fine top dressing and finely chopped thatch to the discharge area; and,
   f. a means for distributing the fine top dressing and finely chopped thatch to the turf in the discharge area that takes the fine top dressing and finely chopped thatch from the means for transporting the fine top dressing and finely chopped thatch and distributes the fine top dressing on the turf.

2. A processor that processes soil aeration cores taken from the turf and turns them into top dressing and finely chopped thatch for soil as in claim 1 wherein:
   a. the means for distributing the fine top dressing and finely chopped thatch to the turf in the discharge area is a cylindrical brush that brushes the top dressing and finely chopped thatch from the means for transporting the fine top dressing and finely chopped thatch in the discharge area.

3. A processor that processes soil aeration cores taken from the turf and turns them into top dressing and finely chopped thatch for soil as in claim 1 wherein:
   a. the means for grinding the soil aeration cores into fine top dressing and finely chopped thatch within the housing is a set of rotating blades within the housing that are adapted such that when the channel receives the soil aeration cores and directs the soil aeration cores into the housing, the channel inputs the cores into the set of rotating blades such that the soil aeration cores will be ground by the rotating blades into fine top dressing and finely chopped thatch for soil.

4. A processor that processes soil aeration cores taken from the turf and turns them into top dressing and finely chopped thatch for soil as in claim 1 wherein:
   a. the means for transporting the fine top dressing and finely chopped thatch from the means for grinding the soil aeration cores into fine top dressing and finely chopped thatch to the discharge area is a rotary conveyor belt adapted such that it fits beneath the means for grinding the soil aeration cores into fine top dressing and finely chopped thatch within the housing and the means for grinding the soil aeration cores distributes the fine top dressing and finely chopped thatch along the rotary conveyor belt.

5. A core processor that is mobile and can be attached to a utility vehicle with a core harvesting device comprising:
   a. a housing; and,
   b. a means for attaching the core processor to the utility vehicle; and,
   c. a channel that receives the soil aeration cores from the core harvesting device and directs the soil aeration cores into the housing; and,
   d. a means for grinding the soil aeration cores into fine top dressing and finely chopped thatch within the housing that is adapted such that when the channel receives the soil aeration cores and directs the soil aeration cores into the housing, the channel inputs the cores into the means for grinding the soil aeration cores into fine top dressing and finely chopped thatch such that the soil aeration cores will be ground by the means for grinding the soil aeration cores completely into fine top dressing and finely chopped thatch for turf; and,
   e. a discharge area; and,
   f. a means for transporting the fine top dressing and finely chopped thatch from the means for grinding the soil aeration cores into fine top dressing and finely chopped thatch to the discharge area adapted such that it receives the fine top dressing and finely chopped thatch form means for grinding the soil aeration cores into fine top dressing and finely chopped thatch and transports the fine top dressing and finely chopped thatch to the discharge area; and,
   f. a discharge area; and,
   g. a means for distributing the fine top dressing and finely chopped thatch to the turf in the discharge area that takes the fine top dressing and finely chopped thatch from the means for transporting the fine top dressing and finely chopped thatch and distributes the fine top dressing and finely chopped thatch on the turf.

6. A processor that processes soil aeration cores taken from the turf and turns them into top dressing and finely chopped thatch for soil as in claim 5 wherein:
   a. the means for grinding the soil aeration cores into fine top dressing and finely chopped thatch within the housing is a set of rotating blades within the housing that are adapted such that when the channel receives the soil aeration cores and directs the soil aeration cores into the housing, the channel inputs the cores into the set of rotating blades such that the soil aeration cores will be ground by the rotating blades into fine top dressing and finely chopped thatch for soil.

7. A processor that processes soil aeration cores taken from the turf and turns them into top dressing for soil as in claim 5 wherein:
   a. the means for transporting the fine top dressing and finely chopped thatch from the means for grinding the soil aeration cores into fine top dressing and finely chopped thatch to the discharge area is a rotary conveyor belt adapted such that it fits beneath the means for grinding the soil aeration cores into fine top dressing and finely chopped thatch within the housing and the means for grinding the soil aeration cores distributes the fine top dressing and finely chopped thatch along the rotary conveyor belt.

8. A processor that processes soil aeration cores taken from the turf and turns them into top dressing and finely chopped thatch for soil as in claim 5 wherein:
   a. the means for distributing the fine top dressing to the turf in the discharge area is a cylindrical brush that brushes the top dressing and finely chopped thatch from the mean for transporting the find top dressing and finely chopped thatch in the discharge area fine top dressing on the soil.

* * * * *